United States Patent
Kim et al.

(10) Patent No.: US 10,088,703 B2
(45) Date of Patent: Oct. 2, 2018

(54) METHOD OF MANUFACTURING DISPLAY DEVICE

(71) Applicant: Samsung Display Co., Ltd., Yongin, Gyeonggi-Do (KR)

(72) Inventors: Changok Kim, Yongin-si (KR); Taeyoung Ahn, Suwon-si (KR); Jihoon Oh, Daegu (KR); Sangwook Lee, Yongin-si (KR); Kiseong Seo, Seoul (KR); Junmo Im, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 344 days.

(21) Appl. No.: 14/877,134

(22) Filed: Oct. 7, 2015

(65) Prior Publication Data
US 2016/0209703 A1    Jul. 21, 2016

(30) Foreign Application Priority Data
Jan. 15, 2015  (KR) .......................... 10-2015-007291

(51) Int. Cl.
*G02F 1/1335*    (2006.01)
(52) U.S. Cl.
CPC .... *G02F 1/133528* (2013.01); *G02F 1/13362* (2013.01); *G02F 2001/133548* (2013.01)

(58) Field of Classification Search
CPC ..................................... G02F 1/1335
See application file for complete search history.

(56) References Cited

U.S. PATENT DOCUMENTS

| | | |
|---|---|---|
| 7,737,933 B2 | 6/2010 | Yamano et al. |
| 7,894,019 B2 | 2/2011 | Yamaki et al. |
| 2008/0192346 A1 | 8/2008 | Kim et al. |
| 2010/0079706 A1 | 4/2010 | Kim et al. |
| 2011/0234553 A1 | 9/2011 | Omoto |

FOREIGN PATENT DOCUMENTS

| | | |
|---|---|---|
| JP | 2002-134441 A | 5/2002 |
| KR | 10-2010-0035347 A | 4/2010 |
| KR | 10-2010-0041525 A | 4/2010 |
| KR | 10-0993382 B1 | 11/2010 |
| KR | 10-2014-0007648 A | 1/2014 |

*Primary Examiner* — Marvin Payen
(74) *Attorney, Agent, or Firm* — H.C. Park & Associates, PLC

(57) ABSTRACT

A method of manufacturing a display device comprises the steps of: forming a protective film on a first surface of a first base substrate; forming a polarizer including a plurality of wire grid patterns provided on a second surface of the first base substrate facing the first surface; removing the protective film from the first surface; and forming a pixel array layer on the first surface.

15 Claims, 16 Drawing Sheets

METHOD OF MANUFACTURING DISPLAY DEVICE

CLAIM OF PRIORITY

This U.S. non-provisional patent application claims priority under 35 U.S.C. § 119 of Korean Patent Application No. 10-2015-0007291 filed on Jan. 15, 2015, the entire contents of which are hereby incorporated by reference.

BACKGROUND OF THE INVENTION

The present invention relates to a method of manufacturing a display device, and more particularly, to a method of manufacturing a display device employing a wire grid polarizer.

In general, metal wires arrayed spaced apart from each other selectively transmit or reflect polarized light of an electromagnetic wave. That is, when an arranging period of the metal wires is shorter than a period of a wavelength of an incident electromagnetic wave, a polarized light component parallel to the metal wires is reflected and a polarized light component vertical to the metal wires is transmitted.

A polarizer having excellent polarized light efficiency, high transmittance, and a wide viewing angle may be manufactured by using this phenomenon, and this polarizer is called a wire grid polarizer.

The wire grid polarizer is recently employed in display devices.

SUMMARY OF THE INVENTION

The present invention provides a method of manufacturing a device which may prevent a failure in a manufacturing process of a display device employing a wire grid polarizer.

Embodiments of the invention provide methods of manufacturing a display device including: forming a protective film on a first surface of a first base substrate; forming a polarizer including a plurality of wire grid patterns provided on a second surface of the first base substrate facing the first surface; removing the protective film from the first surface; and forming a pixel array layer on the first surface.

In other embodiments of the invention, methods of manufacturing a display device include: forming a protective film on a first surface of a first base substrate; forming a polarizer including a plurality of wire grid patterns provided on a second surface of the first base substrate facing the first surface; patterning the protective pattern to form a metal wire; and forming a pixel array layer on the metal wire.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION OF THE INVENTION

Figure 1:
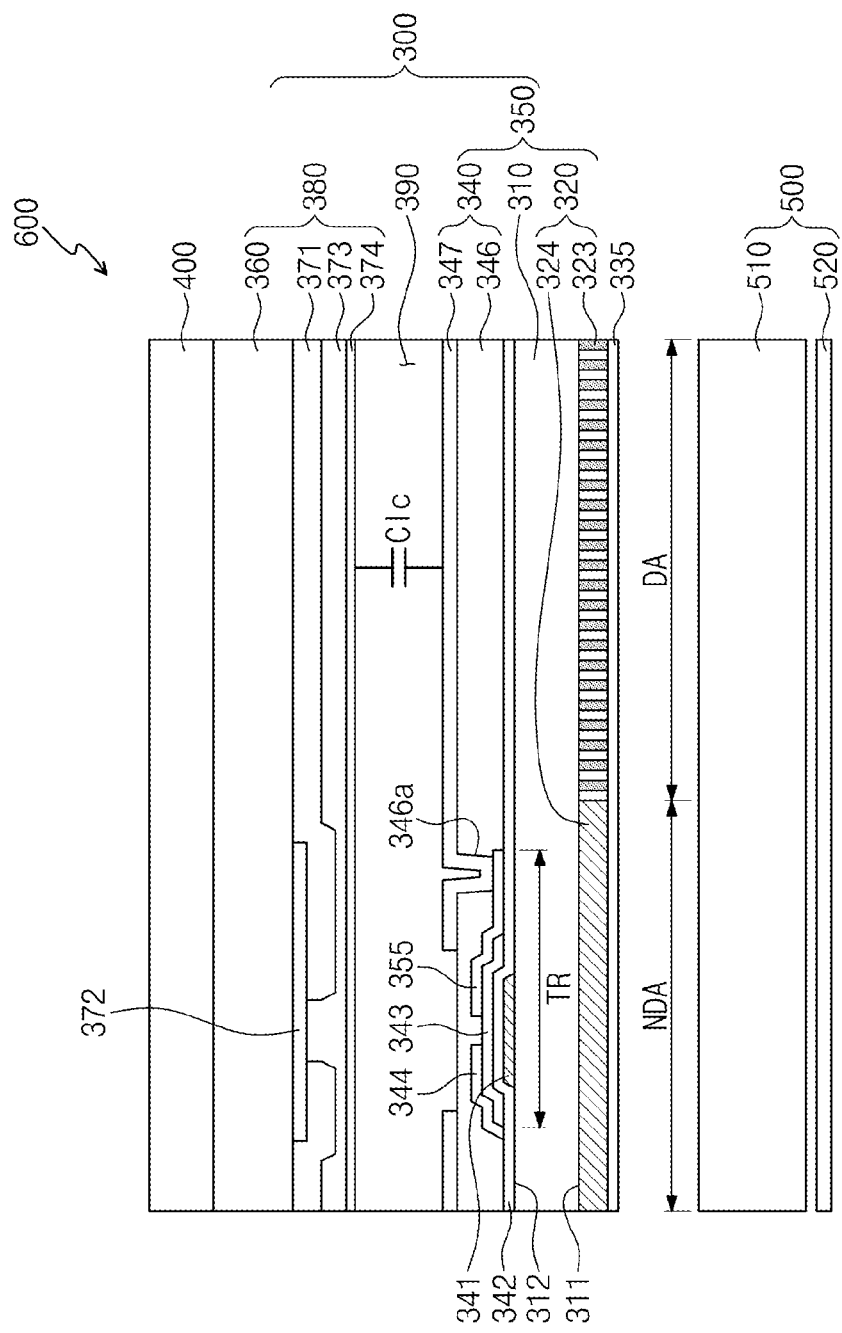
FIG. 1 is a cross-sectional view illustrating a display device according to an embodiment of the invention.

Various modifications and variations can be made in the invention without departing from the spirit or scope of the invention. Exemplary embodiments of the invention will be described below in more detail with reference to the accompanying drawings. It should be understood, however, that it is not intended to limit the invention to the particular form disclosed, but rather it is intended that the invention cover all modifications, equivalents, and alternatives falling within the spirit and scope of the invention as defined by the claims.

In the drawings, like reference numerals refer to like elements throughout. In the drawings, the dimensions of layers and regions are exaggerated for clarity of illustration. Although terms like "first" and "second" are used to describe various components, the components are not limited to these terms. These terms are used only to differentiate one component from another one. For example, without departing from the scope of the invention, a first element could be termed a second element, and similarly a second element could be termed a first element. The terms of a singular form may include plural forms unless referred to in the contrary.

Throughout the specification, when it is said that a part "includes" or "has", it means that the part may be further intended to designate features, integers, steps, operations, elements, components, or the combination thereof. Furthermore, it means that one or more other features, integers, steps, operations, elements, parts or combinations thereof, or the additional possibility, are not precluded. It will also be understood that, when a layer, a film, a region, or a plate is referred to as being 'on' another layer, film, region, or plate, it can be directly on the other layer, film, region, or plate, or intervening layers, films, regions, or plates may also be present. Furthermore, it will be understood that, when a layer, a film, a region, or a plate is referred to as being 'under' another layer, film, region, or plate, it can be directly under the other layer, film, region, or plate, and one or more intervening layers, films, regions, or plates may also be present.

Figure 2:
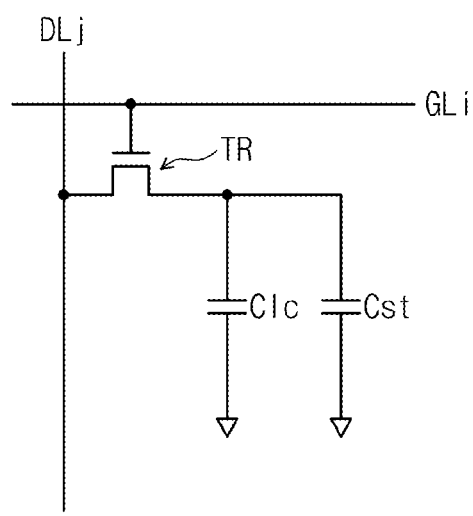
FIG. 2 is an equivalent circuit diagram of the pixel illustrated in FIG. 1.

FIG. 1 is a cross-sectional view illustrating a display device according to an embodiment of the invention and FIG. 2 is an equivalent circuit diagram of the pixel illustrated in FIG. 1.

Referring to FIG. 1, a display device 600 according to an embodiment of the invention includes a backlight unit 500 emitting light and a display panel 300 displaying an image by using the light.

The backlight unit 500 includes a light source (not shown) emitting light, a light guide plate 510 receiving the light from the light source so as to guide the light toward the display panel 300, and a reflector 520 reflecting leaked light from the light guide plate 510 so that the leaked light is re-incident toward the light guide plate 510.

The backlight unit 500 is provided adjacent to a rear surface of the display panel 300, and the light guide plate 510 is formed in a size corresponding to the display panel 300 so as to emit the light toward a front surface. The reflector 520 is provided in a size corresponding to a bottom surface of the light guide plate 510, and is formed of a material having high reflectivity so as to reflect the light leaked through the bottom surface.

The display panel 300 includes a first substrate 350, a second substrate 380 facing the first substrate 350, and a liquid crystal layer 390 interposed between the first substrate 350 and the second substrate 380.

The first substrate 350 includes a first base substrate 310, a pixel array layer 340 provided on a first surface 311 of the first base substrate 310, and a polarizer 320 provided on a second surface 312 of the first base substrate 310 facing the first surface 311.

The display panel 300 is divided into a display area DA and a non-display area NDA. The polarizer 320 includes a plurality of wire grid patterns provided on the second surface 312 corresponding to the display area DA. The polarizer 320 may further include a reflective pattern 324 provided on the second surface 312 corresponding to the non-display area NDA.

As for the wire grid patterns 323, among the light provided from the backlight unit 500, an S wave that is a polarized light component parallel to an extension direction of the wire grid patterns 323 is reflected by a metal property (e.g., aluminum) of the wire grid patterns 323, and a P wave that is a polarized light component parallel to a direction perpendicular to the extension direction of the wire grid patterns 323 is recognized as an effective refractive medium to be transmitted.

The reflective pattern 324 is formed of a material having high reflectivity such as aluminum, thus being able to reflect the light provided from the backlight unit 500. Light reflected through the reflective pattern 324 is reflected by the reflector 520 of the backlight unit 500 so as to be re-incident toward the display panel 300. Accordingly, light use efficiency may be improved by the reflective pattern 324 of the polarizer 320.

The reflective pattern 324 is formed in a size corresponding to the non-display area NDA, thus reflecting incident light toward the non-display area NDA so as to be reused. Accordingly, an amount of light that is re-incident toward the display area DA is increased by the reflective pattern 324, and therefore, light use efficiency of the display device 600 may be improved by the reflective pattern 324.

The display device 600 may further include a transparent protective film 335 formed on the polarizer 320. The transparent protective film 335 may be formed of any one of TiOx and AlOx.

The display panel 300 may include a plurality of pixels, a plurality of gate lines, and a plurality of data lines. Each of the plurality of pixels includes a thin film transistor TR, a liquid crystal capacitor Clc, and a storage capacitor Cst. The storage capacitor Cst may be omitted.

FIG. 2 illustrates an equivalent circuit diagram of a (i×j)-th pixel of the plurality of pixels. In the (i×j)-th pixel, the thin film transistor TR is connected to the i-th gate line GLi of the plurality of gate lines and the j-th data line of the plurality of data line DLj. Thus, the thin film transistor TR responds to a gate signal received from the i-th gate line GLi so as to output a pixel voltage corresponding to a data signal received from the j-th data line DLj.

The liquid crystal capacitor Clc is charged with a pixel voltage output from the pixel transistor TR. An arrangement of liquid crystal molecules included in the liquid crystal layer 390 is changed according to the charge amount charged in the liquid crystal capacitor Clc. Transmittance of incident light into the liquid crystal layer 390 is adjusted according to the arrangement of liquid crystal molecules.

The storage capacitor Cst is connected in parallel with the liquid crystal capacitor Clc. The storage capacitor Cst allows the arrangement of the liquid crystal molecules to be maintained for a certain period.

The pixel array layer 340 may include a thin film transistor TR, an interlayer insulating layer 346, and a pixel electrode 347 which constitute each pixel. Furthermore, the pixel array layer 340 may include a plurality of gate lines and a plurality of data lines. The thin-film transistor TR may include a gate electrode 341, a source electrode 344, and a drain electrode 345. Specifically, the gate electrode 341 is formed on the first surface 311 of the first base substrate 310, and the gate electrode 341 is branched off from a corresponding gate line. The plurality of gate lines and the gate electrode 341 are covered by the gate insulating layer 342. A semiconductor layer 343 is formed on the gate insulating layer 342 corresponding to the gate electrode 341, and the source electrode 344 and the drain electrode 345 are disposed on the semiconductor layer 343 spaced apart at a predetermined distance from each other.

The interlayer insulating film 346 is formed on the gate insulating film 342 for covering the thin film transistor TR, and the pixel electrode 347 is formed on the interlayer insulating film 346. A contact hole 346a exposing the drain electrode 345 of the thin film transistor TR is formed on the interlayer insulating film 346, and the pixel electrode 247 may be electrically connected to the drain electrode 345 through the contact hole 346a.

The structure of the pixel array layer 340 illustrated in FIG. 1 is presented as an embodiment of the invention, and the invention is not limited thereto.

The second substrate 380 includes a second base substrate 360, a color filter layer 371, and a black matrix 372. The second base substrate 360 is disposed so as to face the first base substrate 310, and the black matrix 372 is provided on the second base substrate 360 corresponding to the non-display area NDA. The color filter layer 371 includes red, green and blue color pixels, and each of the color pixels at least corresponds to the display area DA. However, each of the color pixels may overlap the black matrix 372.

The second substrate 380 further includes an overcoat layer 373 and a common electrode 374. The overcoat layer 373 is an insulating layer formed so as to reduce a step difference between the black matrix 372 and the color filter layer 371, and the common electrode 374 is formed on the overcoat layer 373 and faces the pixel electrode 347 so as to form the liquid crystal capacitor Clc.

The liquid crystal layer 390 is provided between the first substrate 350 and the second substrate 380. Liquid crystal molecules in the liquid crystal layer 390 may be arranged according to magnitude of an electric field formed between the pixel electrode 347 and the common electrode 374.

Furthermore, a dichroic polarizer 400 is provided on the display panel 300. The dichroic polarizer 400 is made in the form of a sheet so as to be able to be attached on the display panel 300. A polarization axis of the dichroic polarizer 400 may be parallel or perpendicular to the extending direction of the wire grid patterns 323 of the polarizer 320.

Figure 3:
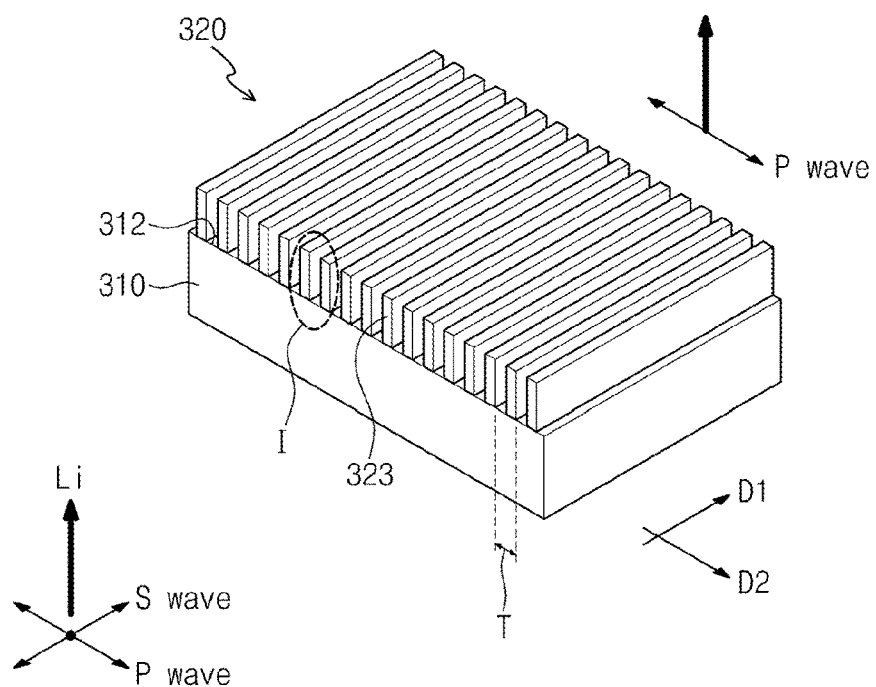
FIG. 3 is a perspective view illustrating a polarizer illustrated in FIG. 1.
Figure 4:
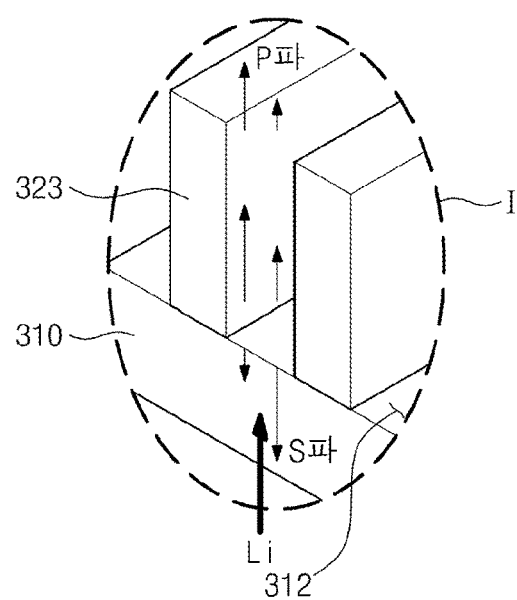
FIG. 4 is an enlarged view of portion "I" illustrated in FIG. 3.

FIG. 3 is a perspective view illustrating the polarizer illustrated in FIG. 1 and FIG. 4 is an enlarged view of portion "I" illustrated in FIG. 3.

Referring to FIGS. 3 and 4, according to one embodiment of the invention, the polarizer 320 includes the plurality of wire grid patterns 323 provided on the second surface 312 of the first base substrate 310.

The first base substrate 310 may be a substrate of a material through which light is transmittable, for example, silicon. In addition, the first base substrate 310 may be a substrate having a rectangular shape.

Each of the wire grid patterns 323 is extended long in a first direction D1. The first direction D1 may be a direction parallel to two sides parallel to each other of the four sides of the first base substrate 310. In addition, the wire grid patterns 323 are arranged in parallel with each other, and spaced apart at a predetermined interval from each other in the second direction D2 perpendicular to the first direction D1.

The polarizer 320 polarizes incident light Li through the wire grid patterns 323. An S wave among the incident light Li is a polarized light component parallel to an extension direction (that is, the first direction D1) of the wire grid patterns 323, and is reflected by a metal property of the wire grid patterns 323. A P wave among the incident light Li is a polarized light component parallel to a direction (that is, the second direction D2) perpendicular to the extension direction of the wire grid patterns 323, and is recognized as an effective refractive medium to be transmitted.

When "T" is an arrangement period of the wire grid patterns 323 and a wavelength of the incident light Li is shorter than an arrangement period T, reflection and transmission occurring according to a polarized light component.

FIGS. 5A to 5K are process flow diagrams illustrating a manufacturing process of the first substrate illustrated in FIG. 1.

Figure 5A:
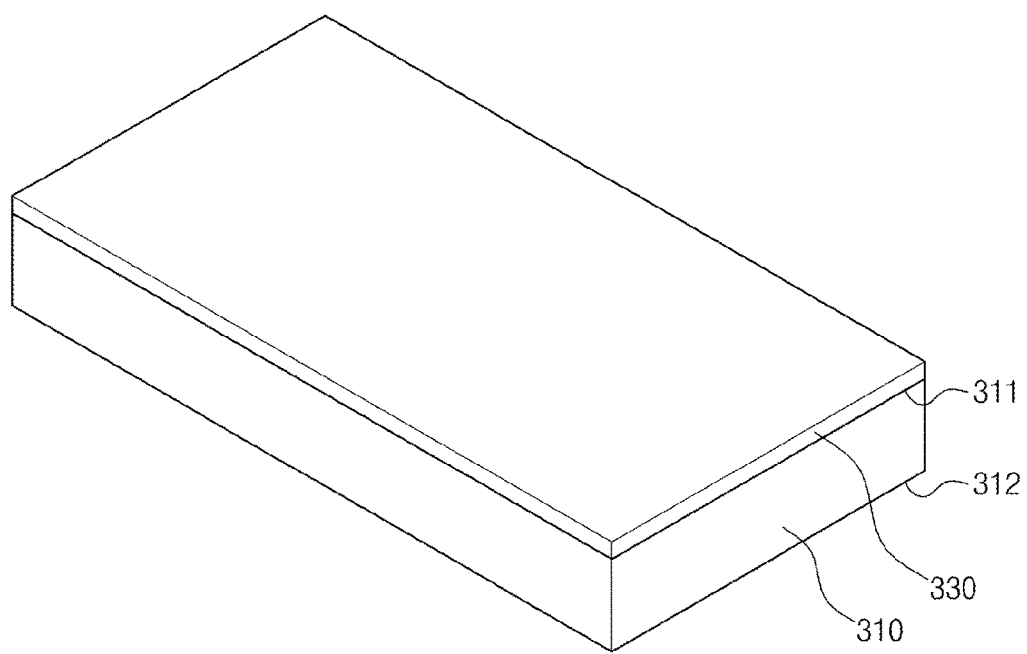
FIGS. 5A to 5K are process flow diagrams illustrating a manufacturing process of the first substrate illustrated in FIG. 1.

Referring to FIG. 5A, a protective layer 330 is formed on the first surface 311 of the first base substrate 310. The protective layer 330 may be formed of a metal material. In one embodiment of the invention, the protective layer 330 may be formed of molybdenum, aluminum (Al) or an alloy thereof.

Figure 5B:
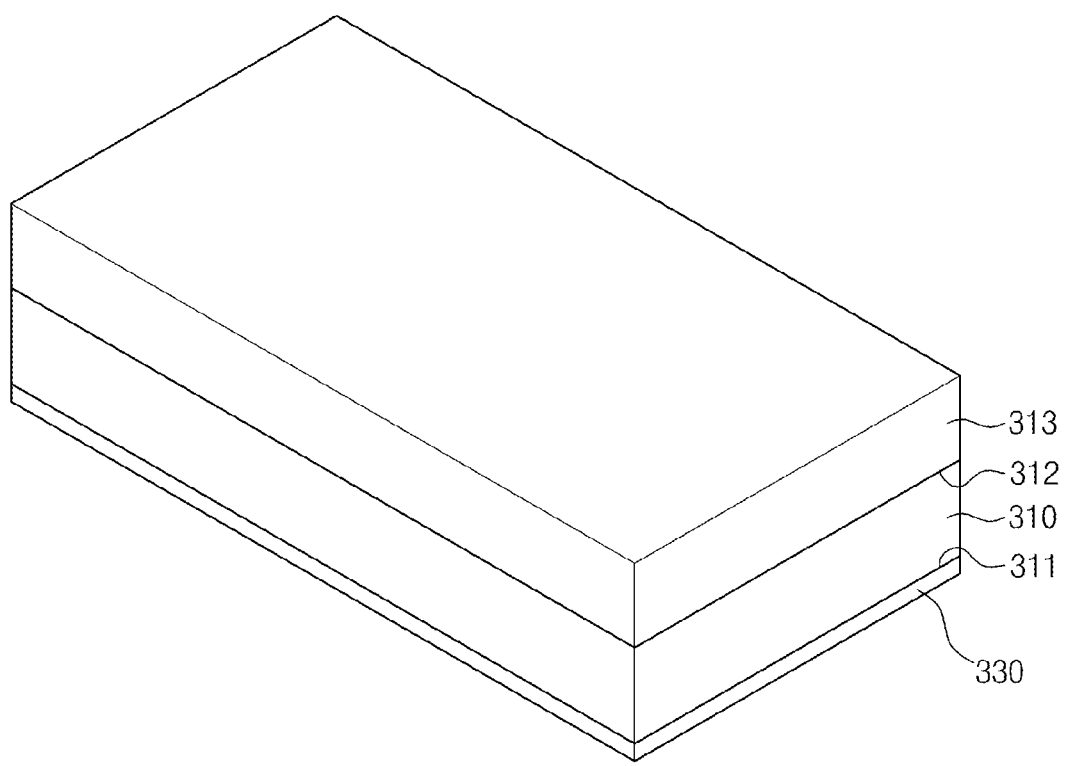
Figure 5C:
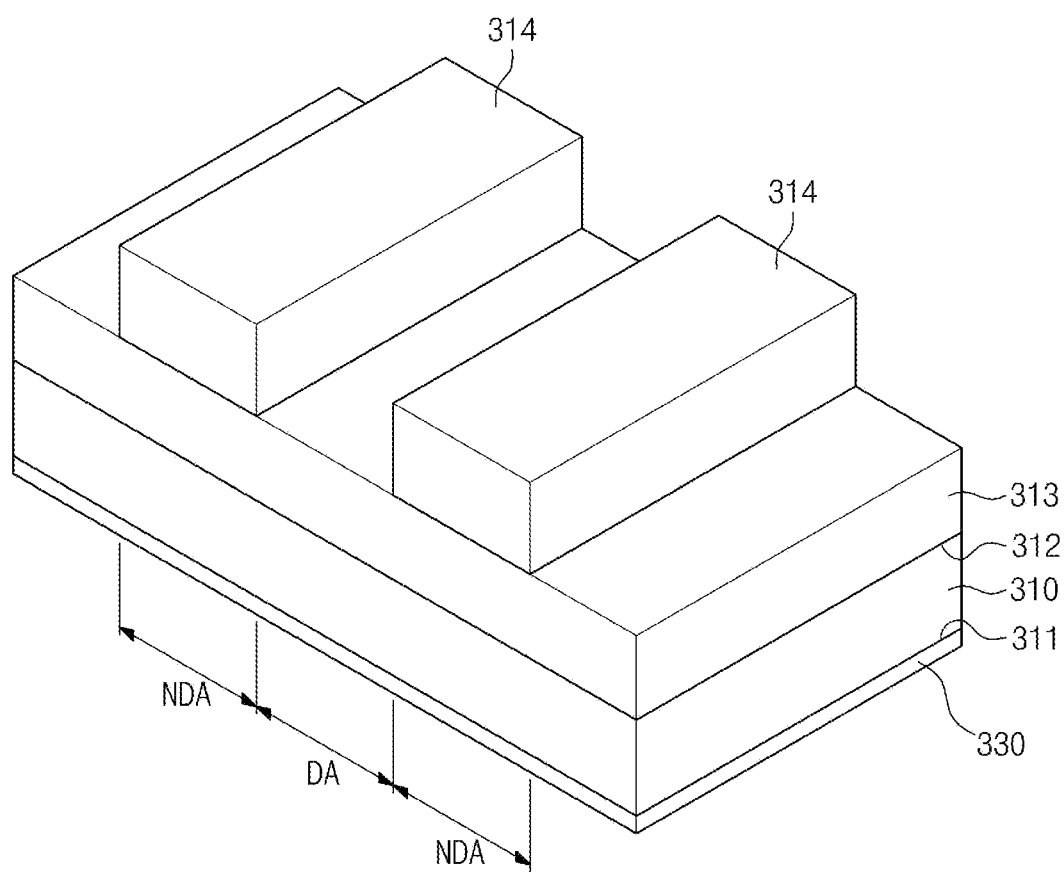

As illustrated in FIG. 5B, a metal layer 313 is formed on the second surface 312 of the first base substrate 310. The metal layer 313 may be formed of aluminum (Al). As illustrated in FIG. 5C, photoresist patterns 314 are formed on the metal layer 313. In one embodiment of the invention, the photoresist patterns 314 are provided in correspondence with the non-display area NDA, and the photoresist patterns 314 are not provided in the display area DA.

Figure 5D:
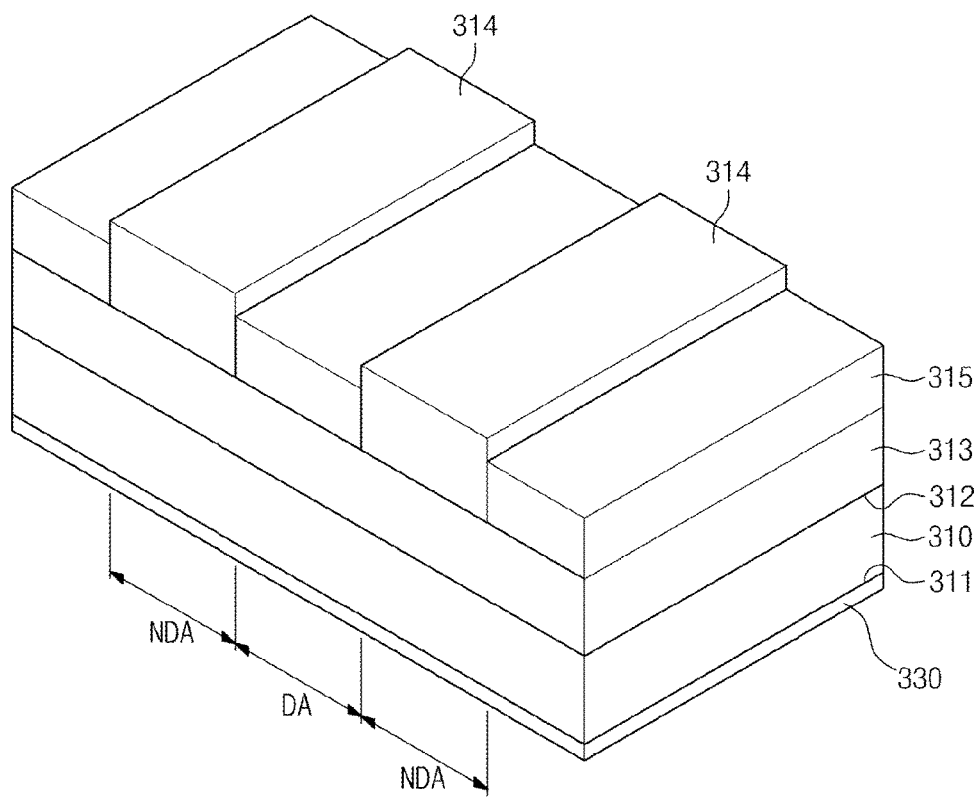

Referring to FIG. 5D, a space between the photoresist patterns 314 is filled with a copolymer layer 315. Herein, the copolymer layer 315 may be formed at a smaller height than the height of each of the photoresist patterns 314. In one embodiment of the invention, the copolymer layer 315 includes a first polymer and a second polymer which are distributed in unspecified directions. The first and second polymers may be poly methylmethacrylate (PMMA) and poly styrene (PS), respectively.

Figure 5E:
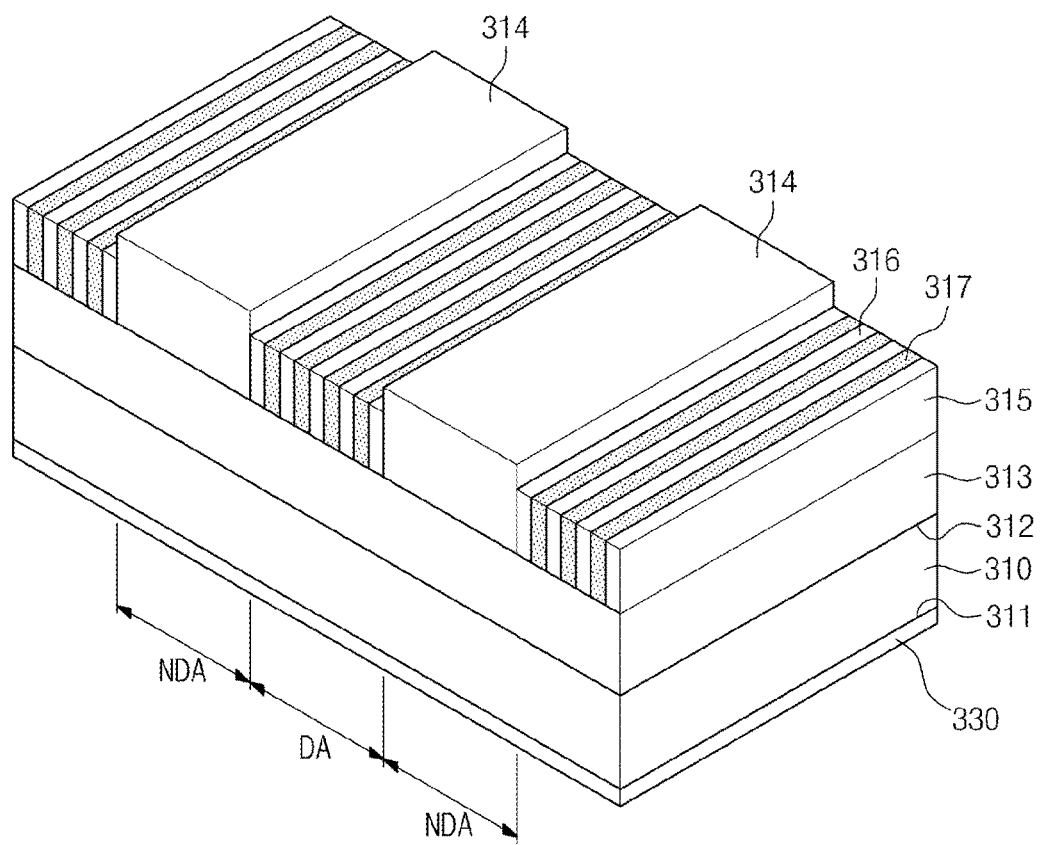

When heat-treated, the copolymer layer 315 is phase separated into the first and second polymers 316 and 317, respectively, as illustrated in FIG. 5E. In particular, the first and second polymers 316 and 317, respectively, may be alternately arranged between two photoresist patterns 314.

Figure 5F:
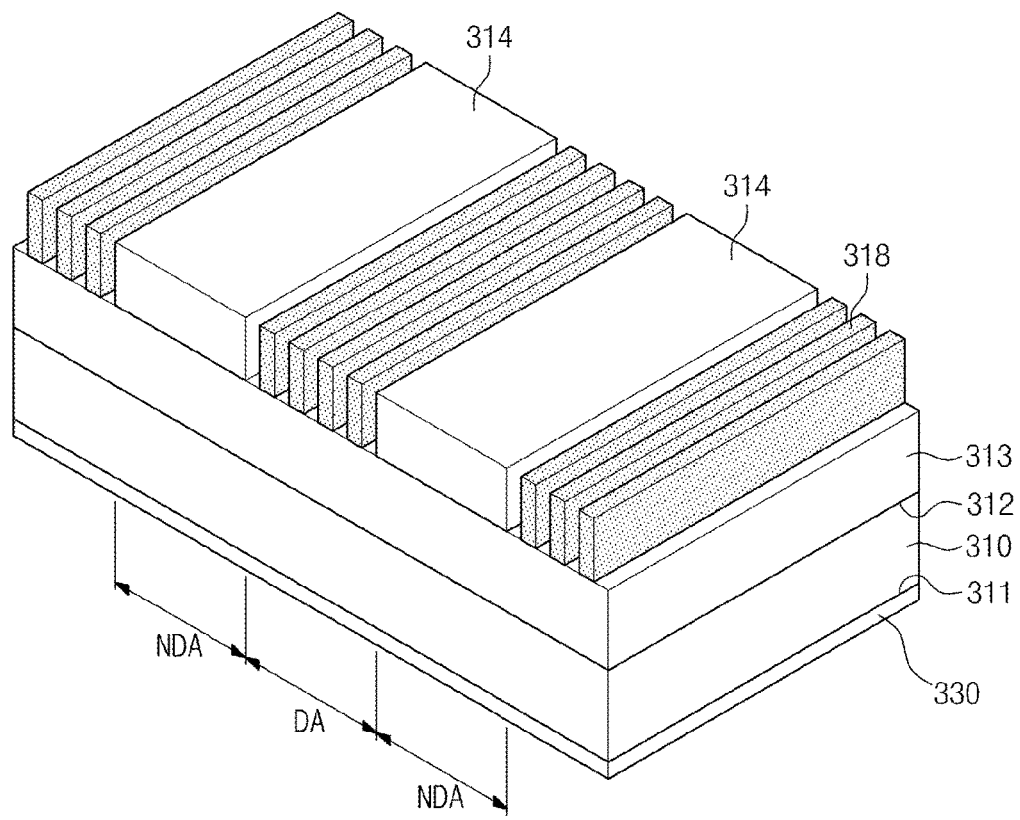
Figure 5G:
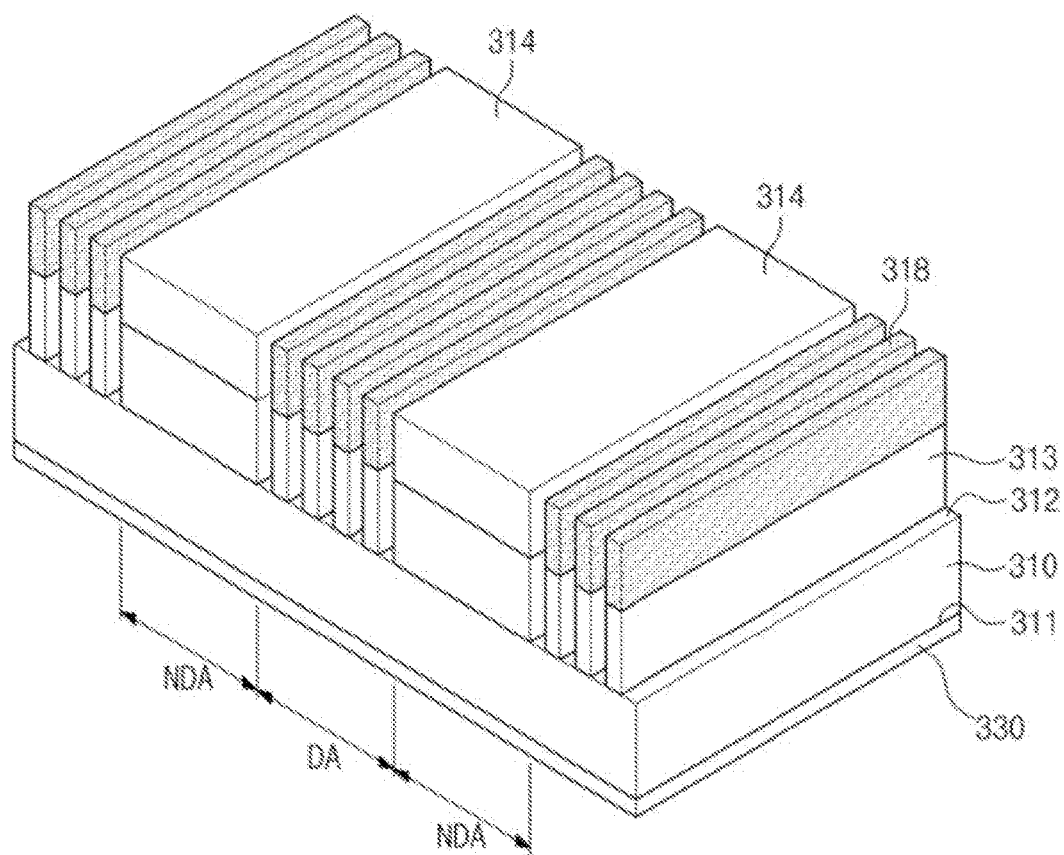

Then, when any one of the first and second polymers 316 and 317 is removed, the remaining one type polymers are spaced apart from each other between the two photoresist patterns 314 to form a nano-grid pattern 318 as illustrated in FIG. 5F. In one embodiment of the invention, the first polymer 316 formed of PMMA is removed and the second polymer 317 may be left to form the nano-grid pattern 318.

Thereafter, the metal layer 313 is etched by using the nano-grid pattern 318 and the photoresist patterns 314 as masks. Then, the wire grid patterns 323 and the reflective pattern 324 are formed on the second surface 312 as illustrated on FIG. 5G.

Figure 5H:
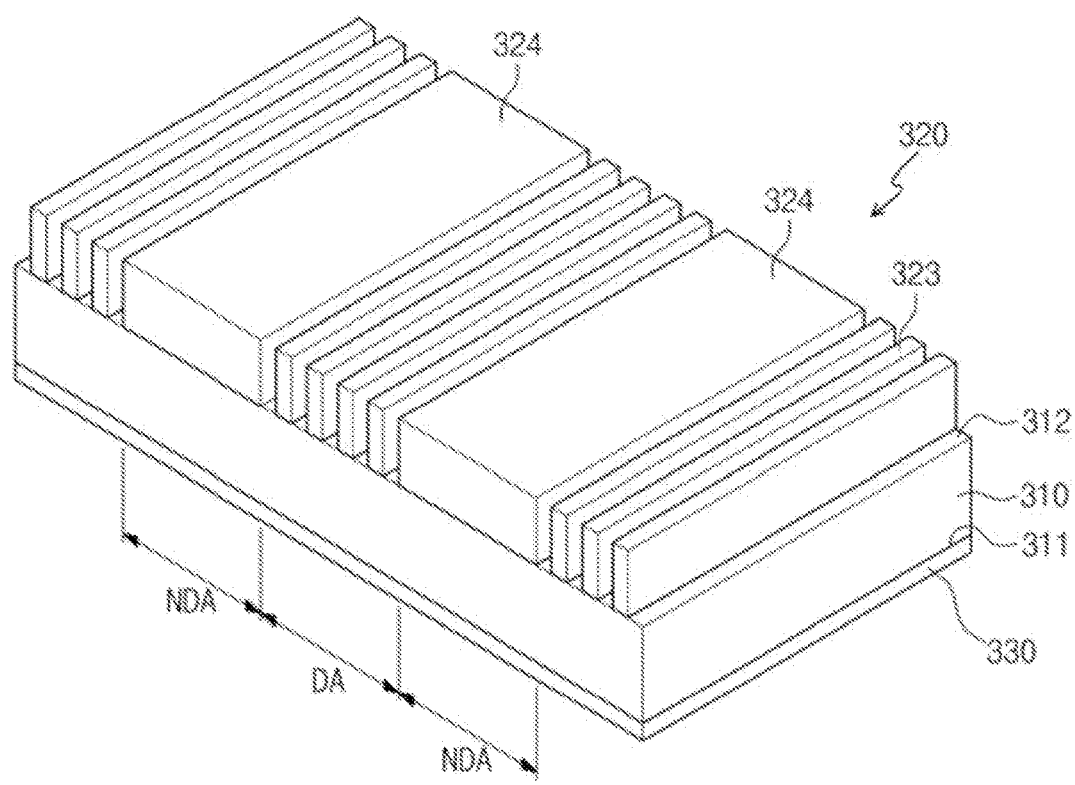

Referring to FIG. 5H, the photoresist pattern 314 and the nano-grid pattern 318 which remain on upper surfaces of the wire grid patterns 323 and the reflective pattern 324 may be removed through a strip process. Thus, the polarizer 320 is formed on the second surface 312 of the first base substrate 310.

Figure 5I:
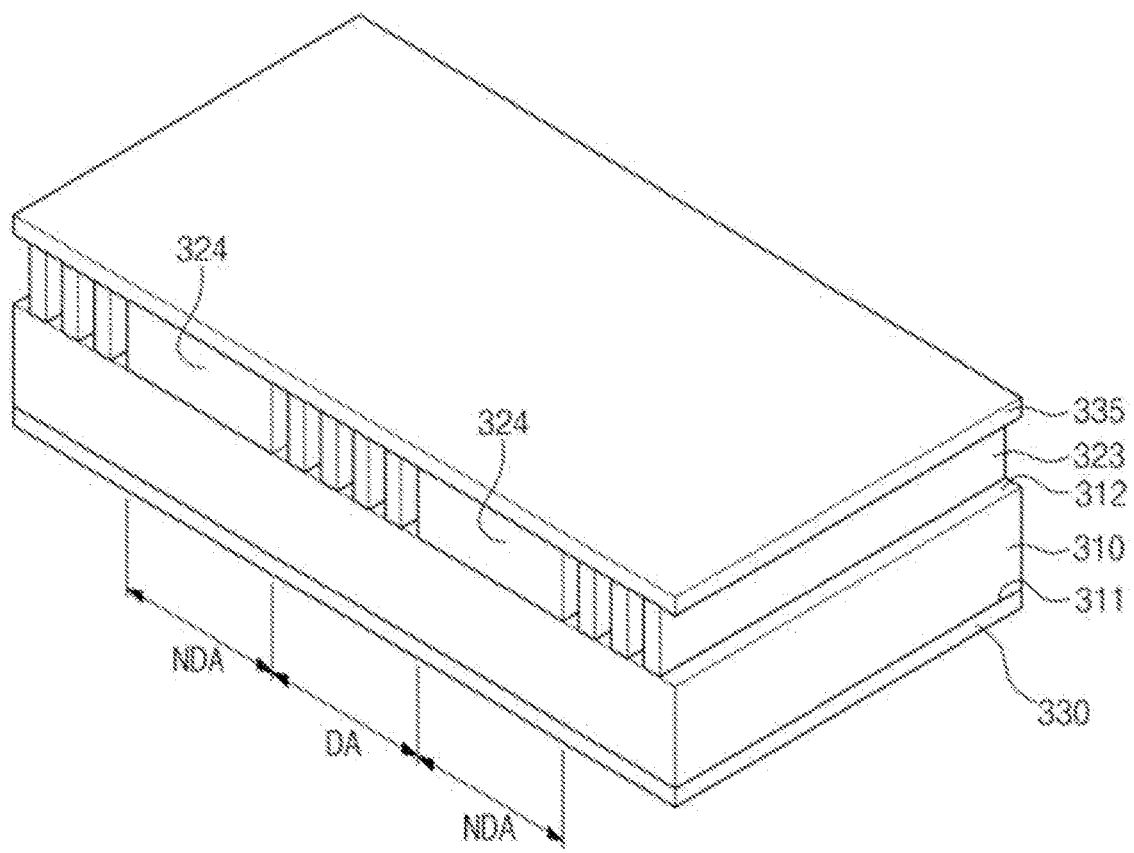

Referring to FIG. 5I, a transparent protective film 335 may be further formed on the polarizer 320. The transparent protective film 335 may be formed of any one of TiOx and AlOx. The transparent protective film 335 may protect the polarizer 320 from a subsequent process.

Figure 5J:
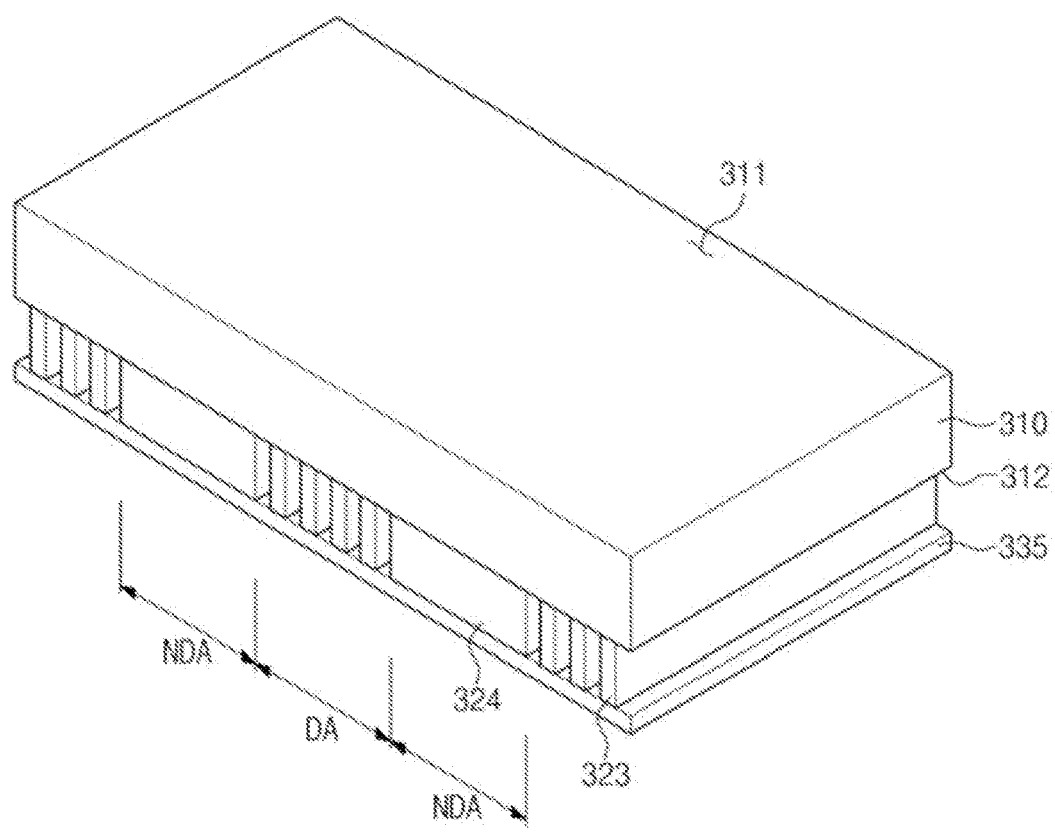

As illustrated on FIG. 5J, the protective film 330 on the first surface 311 of the first base substrate 310 is removed through an etching process. The protective film 330 is formed to prevent a failure in which a foreign substance is adsorbed on the first surface 311 or a scratch occurs on the first surface 311 in a process of forming the polarizer 320 on the second surface 312 of the first base substrate 310. The protective film 330 may be formed on the first surface 311 in advance before a process of forming the polarizer 320 on the second surface 312 starts, and the protective film 330 may be removed from the first surface 311 through the etching process after the process of forming the polarizer 320 is completed.

Figure 5K:
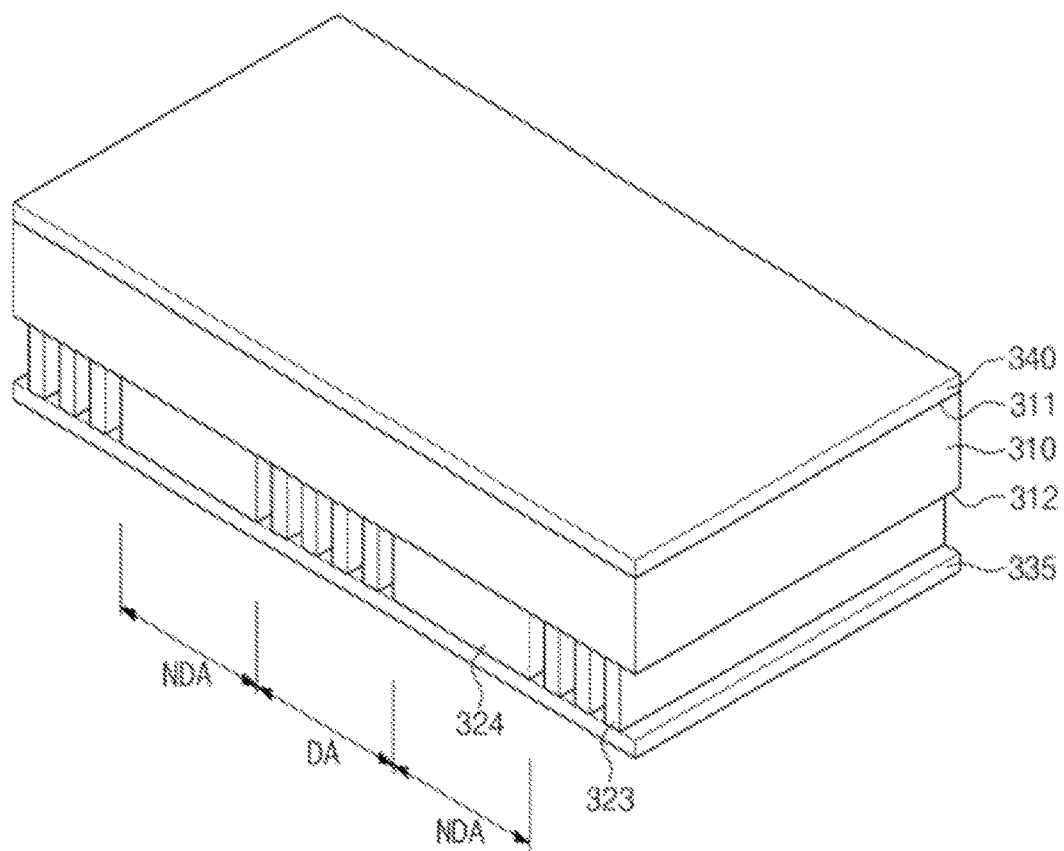

Thereafter, when the protective film 330 is removed, a process for forming a pixel array layer 340 on the first surface 311 of the first base substrate 310 is performed as illustrated FIG. 5K. Detailed description of the specific process steps of the pixel array layer 340 will be omitted.

Figure 6A:
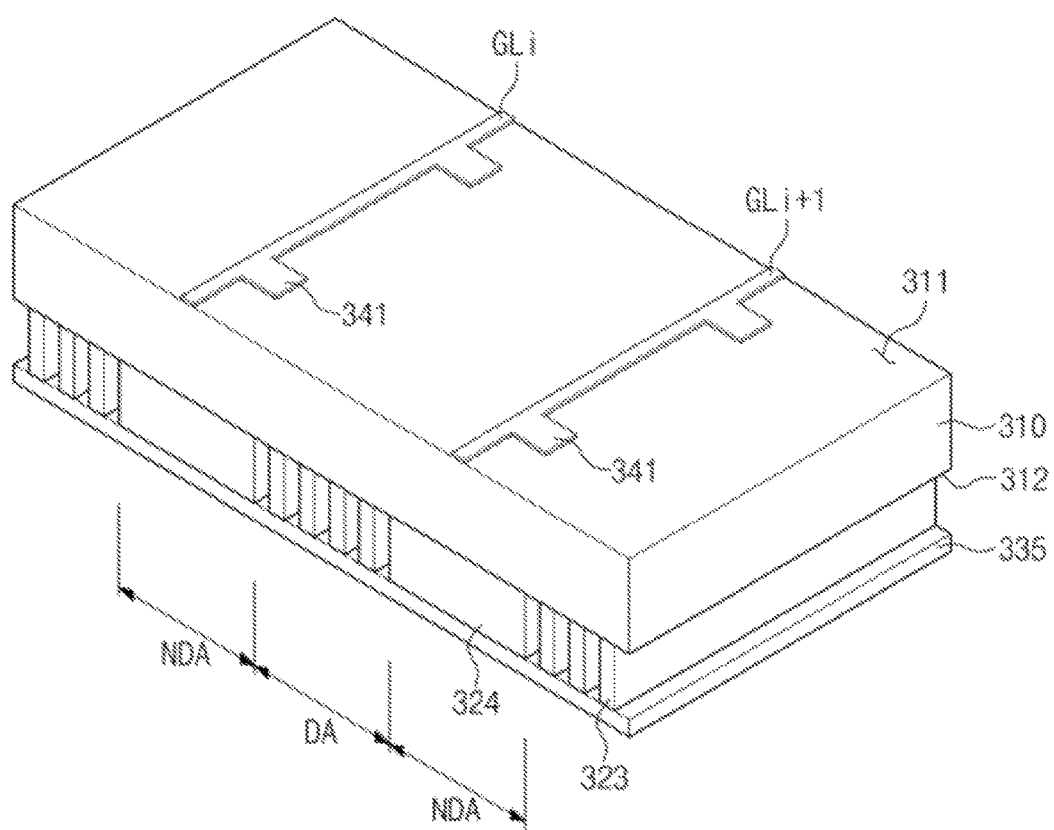
FIGS. 6A to 6B are process flow diagrams illustrating a manufacturing process of a display device according to another embodiment of the invention.
Figure 6B:
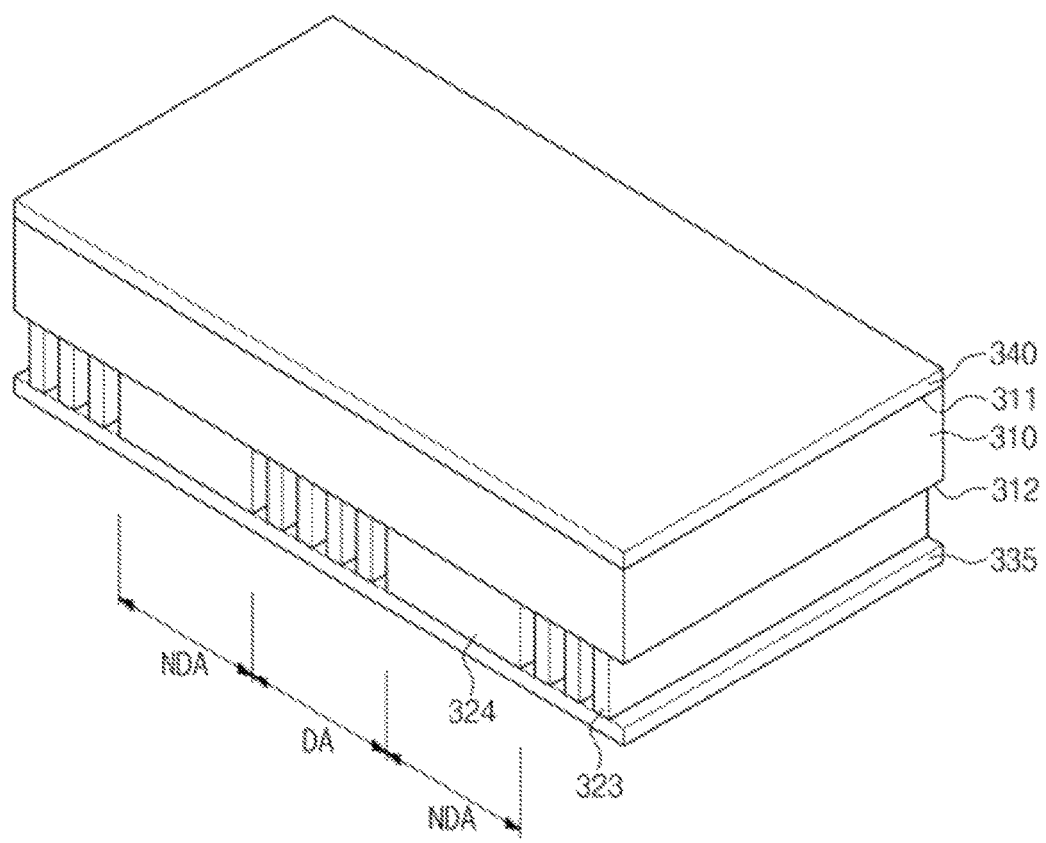

FIGS. 6A to 6B are process flow diagrams illustrating a manufacturing process of a display device according to another embodiment of the invention. However, since a process of forming the polarizer 320 on the second surface 312 of the first base substrate 310 is the same as illustrated in FIGS. 5A to 5I, a description of the process of forming the polarizer 320 will be omitted to avoid repetition.

Referring to FIG. 6A, when the step of forming the polarizer 320 on the second surface 312 of the first base substrate 310 is completed, the protective film 330 (see FIG. 5I) formed on the first surface 311 of the first base substrate 310 is patterned. The protective film 330 may be formed of a metal material such as aluminum, molybdenum, or an alloy thereof. Gate lines GLi and GLi+1 and gate electrodes 341 may be formed on the first surface 311 by patterning the protective film 330.

In consideration of a wire resistance, when it is intended to form the gate lines GLi and GLi+1 and the gate electrode 341 in a double layer or triple layer, the protective film 330 may be formed in a double layer or triple layer in the step of forming the protective layer 330.

When the gate lines GLi and GLi+1 and the gate electrodes 341 are formed by patterning the protective film 330, the step (that is, illustrated in the FIG. 5J) of completely etching the protective layer 330 may be omitted. Furthermore, a step of depositing a metal layer for forming the gate lines GLi and GLi+1 and gate electrodes 341 may be omitted in the process of forming the pixel array layer 340.

Even when a scratch or foreign substance absorption on the protective film 330 occurs in the process of forming the polarizer 320, most of the scratch or foreign absorption substances are removed through the patterning process, and also when the protective film 330 is formed in a double layer or a triple layer, the scratch or the like occurring on the gate lined GLi and GLi+1 does not result in a failure.

According to embodiments of the invention, a protective film is formed on the first surface before a process of forming a polarizer on the second surface of the first base substrate starts, thus preventing a failure in which a foreign substance is absorbed on the first surface or a scratch occurs on the first surface in a process of manufacturing the polarizer.

Therefore, failure occurrence in a process of forming a pixel array layer on the first surface may be prevented.

The above-disclosed subject matter is to be considered illustrative and not restrictive, and the appended claims are intended to cover all such modifications, enhancements, and other embodiments which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A method of manufacturing a display device, the method comprising the steps of:
   forming a protective film on a first surface of a first base substrate;
   forming a polarizer including a plurality of wire grid patterns provided on a second surface of the first base substrate facing the first surface;
   removing the protective film from the first surface; and
   forming a pixel array layer on the first surface.

2. The method of claim 1, wherein the protective film is formed of a metal material.

3. The method of claim 1, further comprising the step of forming a transparent protective film on the polarizer.

4. The method of claim 3, wherein the transparent protective film is formed of any one of TiOx and AlOx.

5. The method of claim 1, wherein the step of forming a polarizer comprises:
   forming a metal layer on the first surface;
   forming photoresist patterns on the metal layer;
   providing a copolymer layer including a first polymer and a second polymer between the photoresist patterns;
   heat-treating the copolymer layer so as to arrange the first and second polymers alternately;
   forming a plurality of grid patterns by removing the first polymer of the first and second polymers, and the plurality of grid patterns being formed of the second polymer and spaced apart by at a predetermined distance from each other between the photoresist patterns; and
   etching the metal layer by using the photoresist patterns and the grid patterns as masks so as to form the wire grid patterns.

6. The method of claim 1, further comprising the steps of:
   coupling a second base substrate with the first base substrate; and
   forming a liquid crystal layer between the first and second base substrates.

7. The method of claim 6, wherein at least one of a color filter layer, a black matrix, and a common electrode is formed on the second base substrate.

8. A method of manufacturing a display device, the method comprising the steps of:
   forming a protective film on a first surface of a first base substrate;
   forming a polarizer including a plurality of wire grid patterns provided on a second surface of the first base substrate facing the first surface;
   patterning the protective film to form a metal wire; and
   forming a pixel array layer on the metal wire.

9. The method of claim 8, wherein the metal wire comprises gate lines and gate electrodes.

10. The method of claim 9, wherein the protective film comprises a metal material formed of any one of molybdenum, aluminum, and an alloy thereof.

11. The method of claim 8, further comprising the step of forming a transparent protective film on the polarizer prior to forming the metal wire.

12. The method of claim 11, wherein the transparent protective film is formed of any one of TiOx and AlOx.

13. The method of claim 8, wherein the step of forming the polarizer comprises:
   forming a metal layer on the first surface;
   forming photoresist patterns on the metal layer;
   providing a copolymer layer including a first polymer and a second polymer between the photoresist patterns;
   heat-treating the copolymer layer so as to arrange the first and second polymers alternately;
   forming a plurality of grid patterns by removing the first polymer of the first and second polymers, and the plurality of grid patterns being formed of the second polymer and spaced apart by a predetermined distance from each other between the photoresist patterns; and
   etching the metal layer by using the photoresist patterns and the grid patterns as masks so as to form the wire grid patterns.

14. The method of claim 8, further comprising the steps of:
   coupling a second base substrate with the first base substrate; and
   forming a liquid crystal layer between the first and second base substrates.

15. The method of claim 14, wherein at least one of a color filter layer, a black matrix, and a common electrode is formed on the second base substrate.

* * * * *